United States Patent
LaBerge et al.

(10) Patent No.: US 6,851,032 B2
(45) Date of Patent: Feb. 1, 2005

(54) LATENCY REDUCTION USING NEGATIVE CLOCK EDGE AND READ FLAGS

(75) Inventors: Paul A. LaBerge, Shoreview, MN (US); Jeff W. Janzen, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 164 days.

(21) Appl. No.: 10/222,456

(22) Filed: Aug. 16, 2002

(65) Prior Publication Data

US 2004/0034755 A1 Feb. 19, 2004

(51) Int. Cl.$^7$ .............................................. G06F 12/00
(52) U.S. Cl. ........................... 711/167; 711/115; 711/5; 713/400; 710/105; 710/112
(58) Field of Search ................. 711/5, 115, 167, 711/169, 102, 103, 104, 105; 713/400, 401, 500, 502; 710/105, 106, 112, 116, 123

(56) References Cited

U.S. PATENT DOCUMENTS

| | | | |
|---|---|---|---|
| 5,878,235 A | 3/1999 | Porterfield et al. | 710/112 |
| 5,966,731 A | 10/1999 | Barth et al. | 711/167 |
| 5,978,872 A | 11/1999 | Porterfield et al. | 710/100 |
| 5,991,843 A | 11/1999 | Porterfield et al. | 710/112 |
| 6,067,260 A | 5/2000 | Ooishi et al. | 365/200 |
| 6,125,078 A | 9/2000 | Ooishi et al. | 365/233 |
| 6,266,734 B1 | 7/2001 | LaBerge | 711/5 |
| 6,321,315 B1 | 11/2001 | LaBerge | 711/167 |
| 6,405,296 B1 * | 6/2002 | Barth et al. | 711/167 |
| 6,425,045 B2 | 7/2002 | LaBerge | 711/5 |
| 6,445,624 B1 | 9/2002 | Janzen et al. | 365/191 |
| 6,636,935 B1 * | 10/2003 | Ware et al. | 711/5 |
| 6,724,666 B2 * | 4/2004 | Janzen et al. | 365/191 |

* cited by examiner

*Primary Examiner*—Hiep T. Nguyen
*Assistant Examiner*—Brian R. Peugh
(74) *Attorney, Agent, or Firm*—Fletcher Yoder

(57) ABSTRACT

A method of selecting CAS latencies in a system. Specifically, a system which includes a plurality of memory devices and a memory controller is provided. Because different memory devices may have different CAS latencies, a system CAS latency is selected wherein the system CAS latency is the fastest common CAS latency of each of the plurality of memory devices. After a read request is delivered to a memory device, the memory controller initiates a transmission flag to the memory device at a time equal to the system CAS latency, indicating that it is safe to transmit the requested data from the memory device to the memory controller. The transmission flags may be used in conjunction with mode registers such that one or both of the transmission flag and the data may be received by or delivered by a corresponding memory device.

24 Claims, 3 Drawing Sheets

LATENCY REDUCTION USING NEGATIVE CLOCK EDGE AND READ FLAGS

BACKGROUND OF THE INVENTION

1. Field of the Invention

The present invention relates generally to memory subsystems and, more specifically, to a technique for reducing CAS latency in a memory device.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

In today's complex computer systems, speed, flexibility, and reliability in timing and control are issues typically considered by design engineers tasked with meeting customer requirements while implementing innovations which are constantly being developed for computer systems and their components. Computer systems typically include a plurality of memory devices which may be used to store programs and data and which may be accessible to other system components such as processors or peripheral devices. Each memory device has an associated latency period corresponding to an interval between the time that the memory device receives an access request and the time it delivers the requested data. This time interval between request receipt and data delivery is referred to as the "CAS latency." Because different memory devices are designed with different CAS latencies, a memory controller may be tasked with coordinating the exchange of requests and data in the system between requesting devices and the memory device such that timing parameters, such as CAS latency, are considered to ensure that requests and data are not corrupted by overlapping requests and data.

Typically, memory devices are grouped together to form memory modules such as dual-inline memory modules (DIMM). Computer systems may incorporate numerous modules to increase the storage capacity of the system. Because CAS latency on the memory devices contained on each memory module may differ from one module to another, each memory module is generally checked at boot-up such that the various module and device specific parameters, such as CAS latency, may be conveyed to the memory controller. Thus, each memory module may include a device to convey information, such as size, speed, and voltage, to the memory controller. One such device is a serial presence detect (SPD) which makes it easier for the system BIOS to properly configure the system to fit the particular performance profiles of the devices on the corresponding memory module. An SPD device is typically an eight-pin serial chip which stores information about the memory module including, but not limited to, the module size, speed, voltage, drive strength, and the number of row and column addresses. At boot-up, the BIOS reads these parameters and automatically adjusts values in its chipset to maximize reliability and system performance. If timing parameters are not adjusted at boot-up, the system may produce more errors and/or operate at non-optimal speeds.

To provide design flexibility, memory devices are often configured such that certain parameters, such as CAS latency, may be selected at boot-up. In systems incorporating numerous memory modules, it may be advantageous to adjust the CAS latencies in each of the devices such that they are the same for each device rather than providing devices which may operate at different speeds due to varying CAS latency selection. By selecting a single CAS latency to be applied to each of the devices throughout the system, the memory controller design may be simplified and conflicts may be easier to manage. For example, in a given system, a user may insert two different memory modules, where one memory module may be capable of better (i.e., lower) CAS latency. It may be desirable to program the better performing memory module to react with the same CAS latency as the slower memory module to simplify controller design, since the controller design may be complicated by providing a mechanism for operating at different CAS latencies depending on which DIMM is accessed.

One mechanism for facilitating the selection of CAS latency in a system involves using mode registers. At boot-up, the memory controller reads the SPD device on each memory module. After determining the current system configuration and the slowest memory module, a mode register in each memory module is written with the desired CAS latency (here the CAS latency of the slowest module in the present system). Thus, the mode registers are set to define the actual CAS latency of each memory device.

The present invention may address one or more of the problems set forth above.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
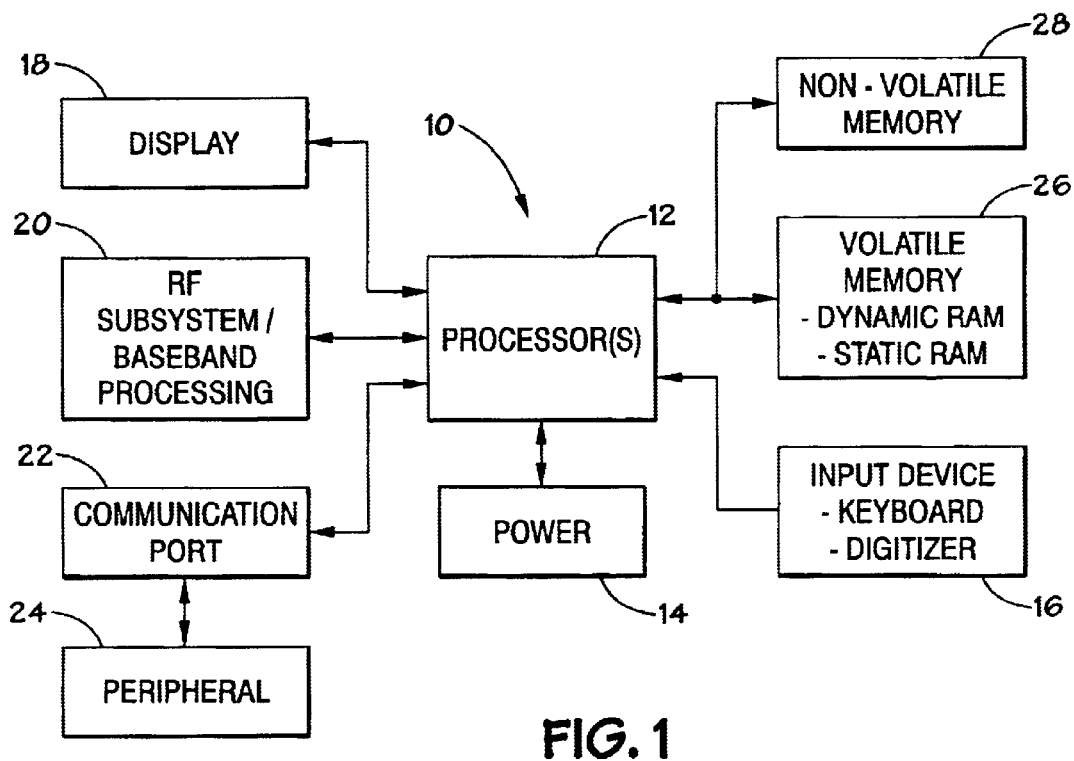
FIG. 1 illustrates a block diagram of an exemplary processor-based device.

Turning now to the drawings, and referring initially to FIG. 1, a block diagram depicting an exemplary processor-based system, generally designated by reference numeral 10, is illustrated. The system 10 may be any of a variety of types such as a computer, pager, cellular phone, personal organizer, control circuit, etc. In a typical processor-based device, one or more processors 12, such as a microprocessor, controls the processing of system functions and requests in the system 10.

The system 10 typically includes a power supply 14. For instance, if the system 10 is a portable system, the power supply 14 may advantageously include permanent batteries, replaceable batteries, and/or rechargeable batteries. The power supply 14 may also include an AC adapter, so the system 10 may be plugged into a wall outlet, for instance. The power supply 14 may also include a DC adapter such that the system 10 may be plugged into a vehicle cigarette lighter, for instance. Various other devices may be coupled to the processor 12 depending on the functions that the system 10 performs. For instance, a user interface 16 may be coupled to the processor 12. The user interface 16 may include buttons, switches, a keyboard, a light pen, a mouse, and/or a voice recognition system, for instance. A display 18 may also be coupled to the processor 12. The display 18 may include an LCD display, a CRT, LEDs, and/or an audio display, for example. Furthermore, an RF sub-system/baseband processor 20 may also be couple to the processor 12. The RF sub-system/baseband processor 20 may include an antenna that is coupled to an RF receiver and to an RF transmitter (not shown). One or more communication ports 22 may also be coupled to the processor 12. The communications port 22 may be adapted to be coupled to one or more peripheral devices 24 such as a modem, a printer, a computer, or to a network, such as a local area network, remote area network, intranet, or the Internet, for instance.

Because the processor 12 controls the functioning of the system 10 by implementing software programs. Generally, the memory is operably coupled to the processor 12 to store and facilitate execution of various programs. For instance, the processor 12 may be coupled to the volatile memory 26 which may include Dynamic Random Access Memory (DRAM) and/or Static Random Access Memory (SRAM). The processor 12 may also be coupled to non-volatile memory 28. The non-volatile memory 28 may include a read-only memory (ROM), such as an EPROM, and/or flash memory to be used in conjunction with the volatile memory. The size of the ROM is typically selected to be just large enough to store any necessary operating system, application programs, and fixed data. The volatile memory 26 on the other hand, is typically quite large so that it can store dynamically loaded applications and data. Additionally, the non-volatile memory 28 may include a high capacity memory such as a tape or disk drive memory.

Figure 2:
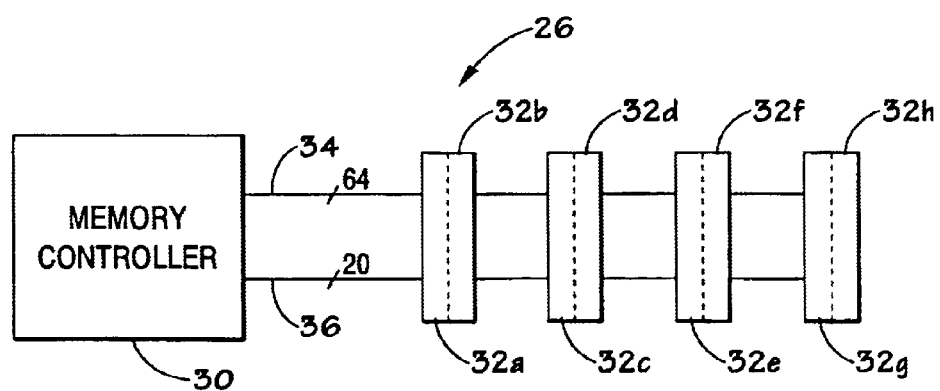
FIG. 2 illustrates an exemplary memory sub-system in accordance with the present techniques.

FIG. 2 generally illustrates a block diagram of a portion of a memory sub-system, such as the volatile memory 26. A memory controller 30 is generally provided to facilitate access to the storage devices. While the present embodiment illustrates the memory controller 30 as existing in the memory sub-system, the memory controller 30 may be in the processor 12 or may exist in a completely separate chip, as can be appreciated by those skilled in the art. The memory controller 30 may receive requests to access the memory devices via one or more processors, such as the processor 12, via peripheral devices, such as the peripheral device 24, and/or via other systems. As previously discussed, the memory controller 30 is generally tasked with facilitating the execution of the requests to the memory devices and coordinating the exchange of information, including configuration information, to and from the memory devices.

The memory sub-system may include a plurality of slots or ranks 32A–32H which are configured to operably couple a memory module, such as a dual-inline memory module (DIMM), to the memory controller 30 via one or more memory buses. Each DIMM generally includes a plurality of memory devices such as dynamic random access memory (DRAM) devices capable of storing data. The memory buses may include a memory data bus 34 to facilitate the exchange of data between each memory device and the memory controller 30. The memory data bus 34 actually comprises a plurality of single bit data buses each coupled from the memory controller 30 to an individual memory device. In one embodiment of the volatile memory 26, the memory data bus 34 may include 64 individual data buses. In this embodiment, each of the eight memory ranks 32A–32H is capable of supporting a module comprising eight individual memory devices. Further, the memory data bus 34 may include one or more individual buses to each memory rank 32A–32H which may be used for ECC error detection and correction. As can be appreciated by those skilled in the art, the individual buses in the memory data bus 34 will vary depending on the configuration and capabilities of the system 10.

The volatile memory 26 also includes a command bus 36 on which address information such as command address (CA), row address select (RAS), column address select (CAS), write enable (WE), bank address (BA), and chip select (CS), for example, may be delivered for a corresponding request. Further, the command bus 36 may also be used to facilitate the exchange of configuration information at boot-up, as previously discussed. As with the memory data bus 34, the command bus 36 may actually comprise a plurality of individual command buses. In the present embodiment, the command bus may include 20 individual buses. As previously explained with reference to the memory data bus 34, a variety of embodiments may be implemented for the command bus 36 depending on the system configuration.

Figure 3:
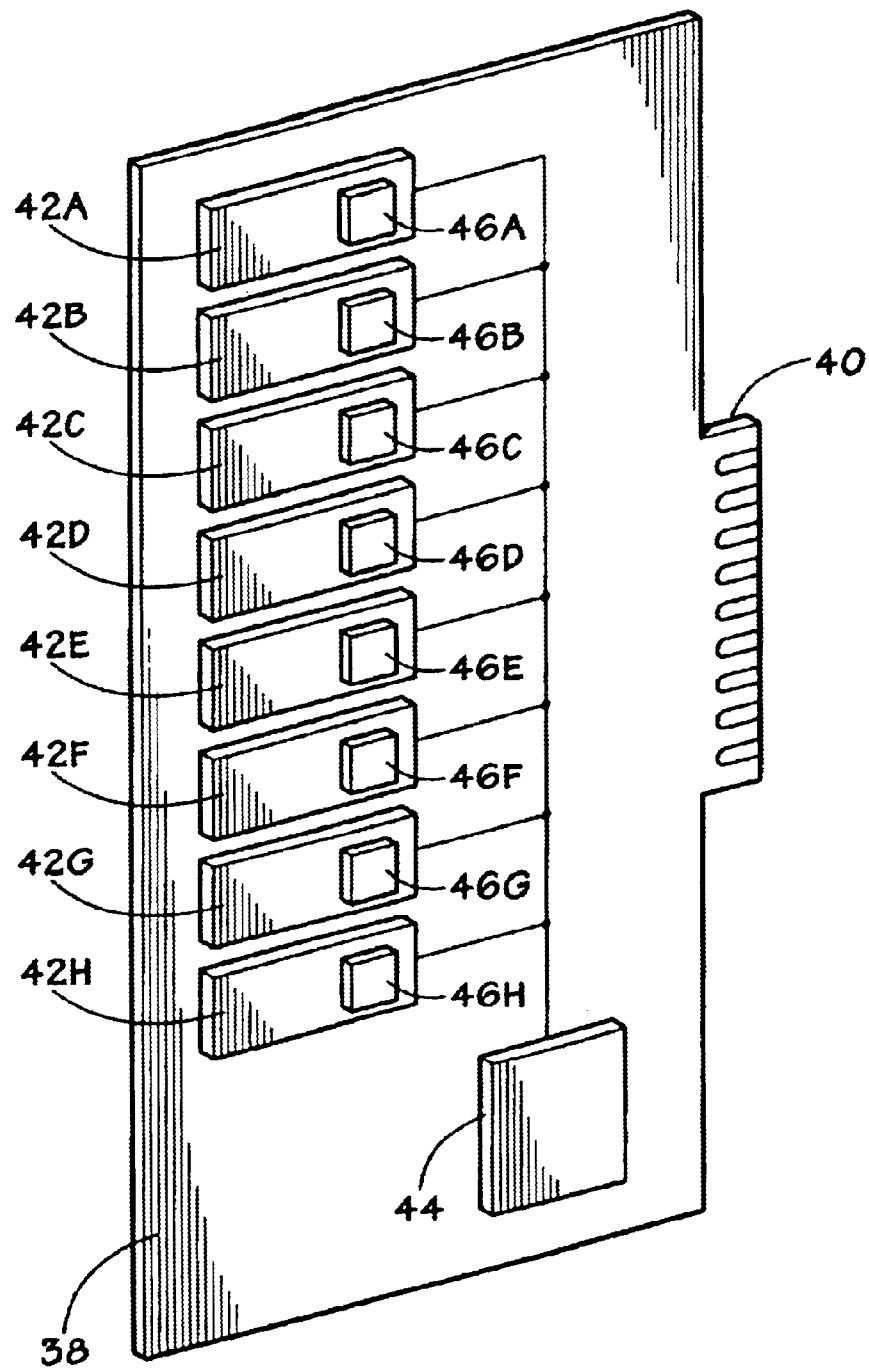
FIG. 3 illustrates an exemplary memory module in accordance with the present techniques.

FIG. 3 illustrates an exemplary memory module 38, such as a DIMM, that may be inserted in one of the memory ranks 32A–32H. The memory module 38 may include an edge connector 40 to facilitate mechanical coupling of the memory module 38 into a memory rank 32A–32H. Further, the edge connector 40 provides a mechanism for facilitating the exchange of data and control signals from the memory controller 30 to devices on the memory module 38. As previously discussed, the memory module 38 may include a plurality of memory devices 42A–42H, such as synchronous dynamic random access devices (SDRAMs), which may be used for storing information. Further, the memory module 38 may include a device, such as a serial presence detect (SPD) device 44, which may be used to store configuration information, such as storage capacity and timing requirements, for each memory device 42A–42H on the memory module 38.

Each memory device 42A–42H may facilitate a programmable CAS latency. Generally, each of the memory devices 42A–42H on a single memory module 38 have the same range of CAS latencies. However, the range of CAS latencies may vary from one module to the next. As previously discussed, the present system may facilitate the use of multiple memory modules, each with different potential CAS latencies. To simplify system control, it may be advantageous to program each memory device on every memory module in the system with the same CAS latency. One technique for adjusting the CAS latency for each device such that every device in the system operates with the same CAS latency period is using mode registers 46A–46H in each of the memory devices 42A–42E. At boot-up (or at a requested time), the SPD 44 in each of the memory modules 38 indicates the CAS latency for the corresponding memory module 38. The memory controller 30 determines the fastest common CAS latency of each memory device and transmits it to each of the memory modules 38 such that the SPD 44 (or any control device) in each memory module 38 can set the system CAS latency for each memory device 42A–42H. The system CAS latency is written into a mode register 46A–46H in each memory device 42A–42H. However, in some applications, it may be advantageous to provide an alternate mechanism for setting the CAS latency. Further, any possible latency reduction would be desirable.

One alternate method of controlling the CAS latency is to use read flags sent from the memory controller 30. Recall that the "CAS latency" refers to the amount of time from when a memory device 42A–42H receives a read request to when the memory device 42A–42H actually sends the read data. As discussed above, in one technique, a mode register 46A–46E in each memory device 42A–42E contains a stored value corresponding to the time between request receipt and data transmission (i.e. CAS latency). Instead of relying on the value stored in the mode register 46A–46E, the memory controller 30 can send a read request, followed at some time later by a transmission flag. Upon receipt of the transmission flag, requested data is sent from the memory device 42A–42H to the memory controller 30. Thus, rather than relying on a static value stored in the mode register 46A–46H, the CAS latency is defined by the memory controller 30 and the transmission flag. The transmission flag can be sent using the same clock as the command/address bus 36. This allows for easy capture of data in a double data rate (DDR) system since the command/address bus 36 runs at half the speed of the data bus 34. In one embodiment, the use of the transmission flag from the memory controller 30 to define the CAS latency eliminates the use of the mode registers 46A–46H entirely.

Figure 4:
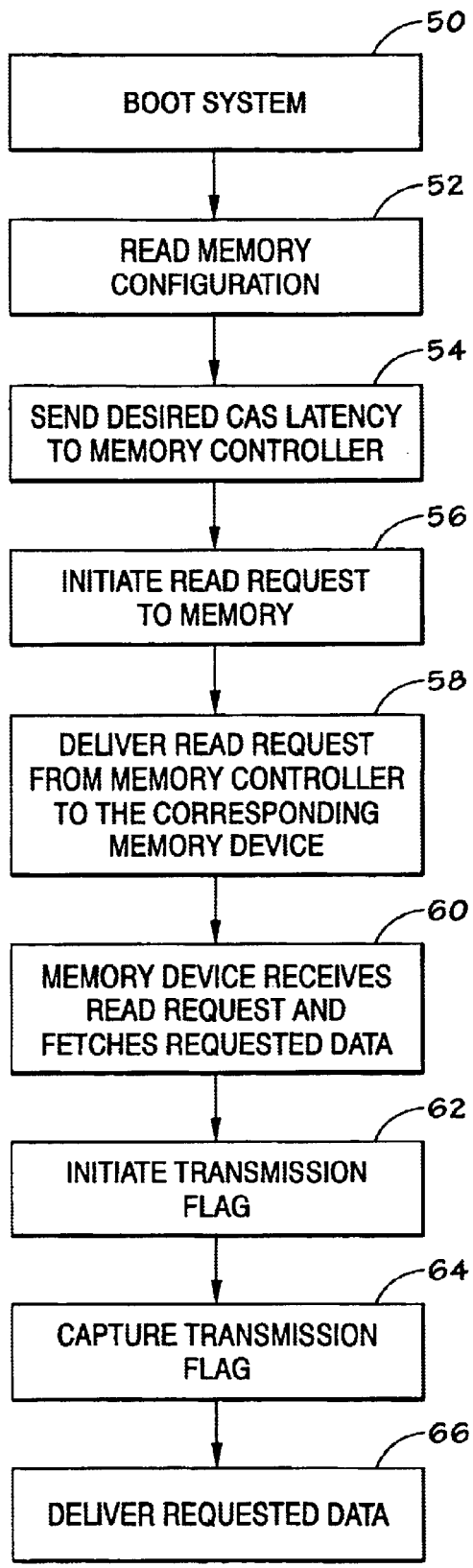
FIG. 4 is a flow chart illustrating an exemplary method for selecting CAS latency in accordance with the present techniques.

FIG. 4 illustrates an exemplary technique for incorporating transmission flags to select the CAS latency in a computer system, such as the system 10. Initially, the computer system is powered on at system boot-up, as indicated in block 50. At boot-up, the system BIOS generally checks the current system configuration, including the memory configuration, as indicated by block 52. The BIOS may read a device on each memory module, such as an SPD device, which includes configuration registers describing what devices and device parameters exist on the corresponding memory module. Once the memory configuration is determined, the BIOS will normally determine the fastest CAS latency at which all of the devices currently incorporated into the system may be run. Rather than sending the selected system CAS latency to each of the devices/ ranks such that they may be stored in mode registers, the system CAS latency is delivered to the memory controller, as indicated in block 54, where it can be stored in a register and used by the memory controller to determine the appropriate time or times for initiating the transmission flags to the various memory modules. Because a memory device may require a lead time associated with preparing to send read data, a lead time may be added to the CAS latency in typical systems. Here, the transmission flag may, for example, equal the CAS latency minus any predetermined lead time Once the system is fully operationally and read commands to the memory are ready to be issued, the memory controller is prepared to initiate the transmission flags. In a typical read operation, a requesting device initiates a read request to the memory, as indicated in block 56. The read request is delivered to the corresponding memory device through the memory controller, as indicated in block 58.

Upon receiving the read request, the memory device will fetch the requested data, as indicated in block 60. The memory controller initiates a transmission flag to the corresponding memory device at some time after the read request is initiated by the memory controller, as indicated in block 62. The time between the initiation of the read request by the memory device and the initiation of the transmission flag is determined by the system CAS latency which is stored in the memory controller. Next, the memory device captures the transmission flag, as indicated in block 64. Upon receipt of the transmission flag by the corresponding memory device, the requested data is delivered to the requesting device, as indicated in block 66.

In an alternate embodiment, the transmission flag may be used in conjunction with the mode registers 46A–46H to allow for transmission of data on a negative clock edge. As can be appreciated by those skilled in the art, transmission of data on a negative clock edge could reduce cycle time by a half a clock cycle which would improve overall system performance. In this embodiment, the mode register 46A–46H would be programmed such that the corresponding memory device 42A–42H would capture the transmission flag using the negative edge of the command/address clock, for example, rather than the positive edge. In this embodiment, the mode registers 46A–46H are programmed upon system configuration with the same CAS latencies.

Further, the transmission flags may be captured by the memory device 42A–42H on a rising/positive clock edge of the command/address clock, while the data is sent on a negative edge. In this case, the mode register 46A–46H may be programmed such that the memory device 42A–42H can transmit data on the negative clock edge. As with in the preceding embodiment, the mode register is simply used to define when to accept the transmission flag (i.e. rising or falling edge), rather than defining the CAS latency. Again, this embodiment may reduce request cycle time by a half a clock cycle.

While the present embodiment illustrates setting a single CAS latency for the entire system at boot-up and under control of the system BIOS, the system CAS latency may be reset after an event, such as a hot-plug event or a user initiated reset. In this instance, the CAS latency may be reset without powering down the system. The determination and assignment of the best possible system CAS latency may be performed by a host controller in the processor.

A further advantage of implementing transmission flags is the ability to implement different CAS latencies for different ranks/DIMMs without necessitating complex system control. Because the memory controller is tasked with generating the transmission flags, the present system can simply initiate the transmission flags at a time specific to the capabilities of a particular rank. As can be appreciated by those skilled in the art, because the memory controller implements the transmission flags to initiate the read requests to the memory devices, no additional system control is necessary.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A method of processing a read in a memory system including a plurality of memory devices, comprising the acts of:
   initiating a read to a memory controller;
   sending the read from the memory controller to a corresponding memory device;
   fetching data corresponding to the read;
   initiating a transmission flag to the corresponding memory device; and
   sending the data from the memory device to the memory controller in response to the transmission flag.

2. The method of processing a read, as set forth in claim 1, comprising the acts of:
   determining a system CAS latency, the system CAS latency comprising the fastest CAS latency common to each memory device in the system; and
   storing the system CAS latency in the memory controller.

3. The method of processing a read, as set forth in claim 2, wherein the act of initiating the transmission flag comprises the act of initiating the transmission flag at a time after the act of sending the read to the memory device, wherein the time is equal to the system CAS latency.

4. The method of processing a read, as set forth in claim 2, wherein the act of determining comprises the act of reading a configuration device associated with the memory device to determine the CAS latencies which are achievable by the memory devices.

5. The method of processing a read, as set forth in claim 4, wherein the act of reading comprises the act of reading the configuration device at system initialization.

6. The method of processing a read, as set forth in claim 1, comprising the acts of:
   capturing the transmission flag at the corresponding memory device on a first positive edge of a clock signal; and
   sending the data from the corresponding memory device on a second positive edge of the clock signal, the second positive edge being subsequent to the first positive edge of the clock signal.

7. The method of processing a read, as set forth in claim 6, wherein the act of capturing comprises the act of capturing the transmission flag at the corresponding memory device on an edge of a command/address clock.

8. The method of processing a read, as set forth in claim 1, comprising the act of enabling the memory device to capture the transmission flag on a negative edge of a clock signal using a mode register.

9. The method of processing a read, as set forth in claim 8, comprising the acts of:
   capturing the transmission flag at the corresponding memory device on a negative edge of a clock signal; and
   sending the data from the corresponding memory device on a positive edge of the clock signal, the positive edge being subsequent to the negative edge of the clock signal.

10. The method of processing a read, as set forth in claim 9, wherein the act of capturing comprises the act of capturing the transmission flag at the corresponding memory device on an edge of a command/address clock.

11. The method of processing a read, as set forth in claim 1, comprising the act of enabling the memory device to send the data on a negative edge of a clock signal using a mode register.

12. The method of processing a read, as set forth in claim 11, comprising the acts of:
   capturing the transmission flag at the corresponding memory device on a positive edge of a clock signal; and
   sending the data from the corresponding memory device on a negative edge of the clock signal, the negative edge being subsequent to the positive edge of the clock cycle.

13. The method of processing a read, as set forth in claim 12 wherein the act of capturing comprises the act of capturing the transmission flag at the corresponding memory device on an edge of a command/address clock.

14. The method of processing a read, as set forth in claim 1, comprising the acts of:
   enabling the memory device to capture the transmission flag on a first negative edge of a clock signal using a first mode register; and
   enabling the memory device to send the data on a second negative edge of the clock signal using a second mode register.

15. The method of processing a read, as set forth in claim 14, comprising the acts of:
   capturing the transmission flag at the corresponding memory device of a first negative edge of a clock cycle; and
   sending the data from the corresponding memory device on a second negative edge of the clock cycle, the second negative edge being subsequent to the first negative edge of the clock cycle.

16. The method of processing a read, as set forth in claim 15, wherein the act of capturing comprises the act of capturing the transmission flag at the corresponding memory device on an edge of a command/address clock.

17. A memory system comprising:
   a plurality of memory devices configured to store data; and
   a memory controller configured to send reads to the plurality of memory devices and configured to initiate corresponding transmission flags to the plurality of memory devices at a time subsequent to the sending of the respective reads, the transmission flags indicating that the data corresponding to the reads can be sent from the plurality of memory devices to the memory controller.

18. The memory system, as set forth in claim 17, wherein the memory controller is configured to initiate the respective transmission flags to the respective plurality of memory devices at a time equal to the fastest CAS latency common to each of the plurality of memory devices.

19. The memory system, as set forth in claim 17, wherein each of the plurality of memory devices comprises a dynamic random access memory (DRAM) device.

20. The memory system, as set forth in claim 17, wherein the plurality of memory devices are distributed on a plurality of memory modules.

21. The memory system, as set forth in claim 20, wherein each of the plurality of memory modules comprises a storage device configured to store the CAS latency of each of the plurality of memory devices on a corresponding memory module.

22. The memory system, as set forth in claim 21, wherein the storage device comprises a serial presence detect (SPD) device.

23. The memory system, as set forth in claim 17, wherein each of the plurality of memory devices comprises a mode register configured to allow for receipt of the respective transmission flags on a negative edge of a clock signal.

24. The memory system, as set forth in claim 17, wherein each of the plurality of memory devices comprises a mode register configured to allow for sending the data corresponding to the read to the memory controller on a negative edge of a clock cycle.

* * * * *